Sept. 11, 1956　　　G. W. ZOPF, JR　　　2,762,711
THAW INDICATOR
Filed April 29, 1953

GEORGE W. ZOPF, JR., INVENTOR.

BY
*John D. Upham*

United States Patent Office 2,762,711
Patented Sept. 11, 1956

2,762,711
THAW INDICATOR

George W. Zopf, Jr., Dayton, Ohio, assignor to Monsanto Chemical Company, St. Louis, Mo., a corporation of Delaware Application April 29, 1953, Serial No. 351,839

18 Claims. (Cl. 99—192)

This invention relates to thaw indicators. Specific aspects of the invention pertain to the use, as thaw indicators, of materials that are one color when contacted with ice, but change color on becoming wet with liquid water, and that retain the latter color on refreezing.

It is well-known that in the case of many foods, such as corn, lima beans, spinach and meats, after they have been quick frozen in any of the conventional ways known to the art for the purpose of preservation, they will not be satisfactory products if thereafter they are thawed and then refrozen, particularly if this second freezing is a slow one such as occurs in the ordinary home or store freezing compartment. In particular, such products are thereby rendered unpalatable and, depending upon the product, a varying amount of the total food valve is destroyed and the product may be rendered dangerous due to spoiling.

Heretofore there has been no practical means of determining whether or not a thaw has occurred prior to tasting the product. Thus, when retailers received complaints from their customers they had no means of determining whether the thaw occurred as the result of the carelessness of the customer or as the result of careless thawing by the wholesaler, shipper, manufacturer or other handler of the product. It is apparent that the purchaser of a thawed product is put to a great inconvenience of preparing a spoiled product and is subject to the danger resulting from spoiling.

Considerable thought has been given by various persons to the problem of providing for frozen food packages an inexpensive simple positive-acting thaw indicator. Such an indicator must be of a nature that permits its incorporation with ease in or on the frozen food package during the stages of making the package. It must either be of a nature that permits contact with the food itself without danger to persons who later eat the food, or that permits satisfactory isolation from the food and yet positive response to the thawing of the package. It must undergo a positive change of some sort in a manner directly related to the freezing point of water, or the freezing point of the frozen product, the change occurring at a chosen temperature not above 32° F. and sometimes as low as 15° F. Thus, a thaw indicator that acts only at a temperature appreciably above the freezing point of water may fail to indicate that thaw has occurred where the thawing actually takes place at about the freezing point of water.

An object of this invention is to provide a thaw indicator. Another object of this invention is to provide a positive-acting thaw indicator directly responsive to the presence of liquid water. Another object of the invention is to provide as a thaw indicator a material that undergoes a marked change in physical characteristics on coming in contact with liquid water, without that change being reversible on refreezing. Yet another object is to provide an inexpensive thaw indicator. A further object is to provide a thaw indicator capable of being applied to or within a frozen food package in an inexpensive manner. Further objects and advantages of the invention will be apparent to one skilled in the art from the accompanying disclosure and discussion.

The present invention employs as an indicium of thaw, a product prepared by treating a clay having substantial base exchange capacity, e. g., Wyoming bentonite, with relatively small quantities of the type of aromatic amine that is color-forming with such clay. The concept of the present invention is based on my discovery that such materials, hereinafter called clay-amine color bodies for convenience, when dried and then placed in contact with ice (solid $H_2O$) have a different physical appearance with respect to color than when in contact with liquid $H_2O$, and that the color characteristic of the material when in contact with liquid $H_2O$ is not altered by subsequent lowering of the temperature to below the freezing point of water.

For example, in a preferred embodiment of the invention, an essentially dry (not calcined) montmorillonite-containing clay is treated with 1 weight per cent benzidine plus 1 weight per cent formaldehyde, resulting in the development of a brilliant yellow color provided the materials are essentially free from water. This color is not altered on exposure to the moisture of the ambient atmosphere. Furthermore, the color is not altered on contacting the clay-amine color body with ice, even though the contact continues for a long period of time. However, on melting the ice so that the clay-amine color body is then in contact with liquid water, the color immediately undergoes a marked change to a brilliant green. On refreezing the material without removing it from contact with the water, the green color persists even after the temperature is lowered to below the freezing point of water, and the color remains green over a long period of time in contact with solid $H_2O$ in the absence of liquid $H_2O$.

From the foregoing, it will now be apparent that, by providing a frozen food package with one or more indicia such as printing or merely a spot of color, composed of the clay-amine color body and in contact with or subject to contact with $H_2O$ in such manner that the initial "dry" color is present at the time of shipping the frozen package, an ideal thaw indicator is provided. The indicator remains yellow until the package undergoes thawing at which time the indicator immediately undergoes a striking color change to green. Furthermore, this green, indicating that thawing has occurred, is retained even though the food package is refrozen. Thus, the ultimate consumer is protected from purchasing a package that has been thawed even though he may see it in a store in a frozen condition, a retailer is protected from dissatisfied customers, and the manufacturer is protected from damage to his trade name or trade-mark through inadvertent or deliberate sale of materials that have undergone thawing.

On thawing, a frozen product package provides liquid $H_2O$ from numerous sources. Of particular importance, liquid $H_2O$ is formed on the exterior of the package from the air's depositing its contained water on the package due to the cooling of the air by the cold package. The temperature of the package passes through a cool stage when it no longer freezes the condensate but is below room temperature. In addition liquid $H_2O$ on the exterior of the package will be formed by the melting of the frost found on the outside of the package. Further, when the contents of the package thaws, all the liquid $H_2O$ contained by the product frozen is released to wet the interior of the package. In carrying out the present invention any of these sources of liquid $H_2O$ can be employed. Furthermore, in certain preferred aspects of my invention, I deliberately add frozen $H_2O$ in contact with the thaw indicator material so that it will be immediately present when same undergoes thawing without the necessity of obtaining $H_2O$ from the sources indicated above.

In one specific and preferred embodiment of my invention I provide, for use on or in the frozen food package, a sealed capsule made of transparent material, e. g., polyethylene film, polyvinyl chloride film, etc., which is of considerable strength to avoid rupture, said capsule containing clay-amine color body plus $H_2O$. It will be clear from what has been said herein that the $H_2O$ must be introduced into said capsule, prior to use of the capsule, at temperatures below freezing and maintained at such temperature until incorporation in or on the frozen package. When it is desired to indicate that a rise in temperature has occurred to a certain figure below the freezing point of water, e. g., 15° F., I also incorporate in the $H_2O$ placed within the capsule a water-soluble material, e. g., sugar, salt, etc., in amount sufficient to lower the freezing point of the contained $H_2O$ to the given figure, in this instance 15° F.

In the accompanying drawing, Figure 1 illustrates a frozen food package in perspective view, having the word "Thawed" appearing thereon by virtue of the practice of the invention.

Several methods are available for providing indicia composed of clay-amine color bodies on frozen food packages. The particular one chosen will be dependent to some extent upon the color body used. Some of these color bodies are colorless in the dry state. (A change from colorless to colored is considered a change of color herein, and an amine that forms with a clay a colorless adduct that on being wet becomes colored is considered colorforming.) Other clay-amine color bodies have one color in the dry state and a different color in the wet state.

One procedure available only to those which are colorless when dry is to print the word "Thawed" or other warning words directly on the outside of the package or on the interior of the package at a place where the outer coatings of the package are transparent, or on a piece of paper which is inserted below a transparent wrapper of the package. It is, of course, necessary that such a printed word be located at some point where it can come in contact with liquid $H_2O$ on thawing. Frozen $H_2O$ alone or containing added solute for control of melting temperature, can be deliberately placed in contact with the indicator, especially if the latter is not on the outer surface of the package. The printing is invisible until liquid $H_2O$ comes in contact with the clay-amine color body whereupon the printing appears. The printing can be accomplished by suspending the clay-amine color body in any suitable quantities of liquid media of the nature used in inks. However, vehicles should not be present that will act to waterproof the color body so that it would be unaffected by water. Alternatively, the desired word or words can be formed on the package from an adhesive material followed by dusting with powdered colorless clay-amine color body. By another procedure, paper or cloth can be impregnated with the clay-amine color body, either dry, or wet and then dried, and then the desired words cut out and placed at the proper location on the frozen food package. This is not so desirable since the outline of the letters would be visible to some extent. A better procedure is to selectively impregnate paper or cloth with clay-amine color body only in selected areas forming desired words. The foregoing procedures are available only with those clay-amine color bodies that are colorless in the dry state.

Figure 1:
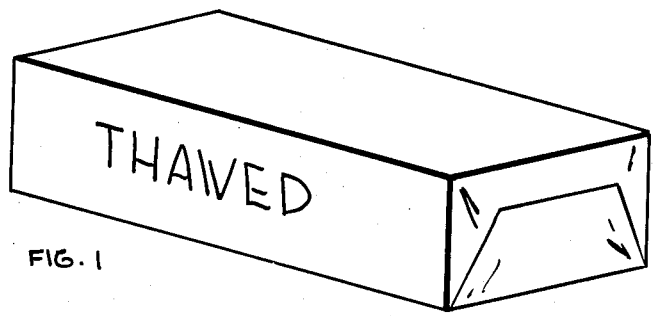
Figure 6:
Figure 6 illustrates one type of thaw indicator wherein the word "Thawed" is impregnated into paper using a clay-amine color body.

Figure 1 illustrates a frozen food package wherein any of the foregoing procedures has been used, and on thawing the clay-amine color body by virtue of the action of liquid $H_2O$ has developed its color and the word "Thawed" shows on the outside of the package, either completely on the outside or showing through a transparent wrapper. Figure 6 shows a sheet of paper or cloth that has been selectively impregnated with clay-amine color body in selected areas forming letters spelling the word "Thawed." Such sheets, shown in the "wet" form in Figure 6 so that the words can be ascertained, can be attached to the outside of the frozen food package in the dry form for later development of the word on thawing, or can be placed at a suitable location inside of the package and in contact with $H_2O$, deliberately added if necessary, for viewing through transparent wrapping or wrappings. Such locations include inside of the cardboard box holding the foodstuff and in contact with the foodstuff provided the cardboard box is cut away and only transparent materials are between the indicator and the exterior of the box. The indicator can be in contact with the foodstuff only in those cases where the clay-amine color body would not have toxic effects. Most aromatic amines are more or less toxic, some of them considerably so, and those skilled in the art will choose only those combinations of clay and amines, usually also with formaldehyde, in which the color body is sufficiently bound to the paper or other material that it will not contaminate the foodstuff or in which the color body has the amine sufficiently bound chemically that it will be innocuous. Tests, the nature of which is obvious, should be made first before using any particular color body for this specific type of application.

Figure 2:
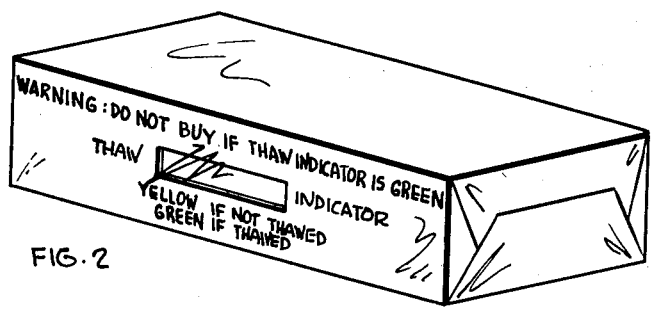
Figure 2 is a perspective view of a different frozen food package, having printed words thereon referring to a thaw indicator.

Figure 2 illustrates a frozen food package with thaw indicator that can be used both with clay-amine color bodies which are colorless in the dry state and those which have a color in the dry state that changes on contact with liquid $H_2O$. In the package of Figure 2, a warning is printed for the customer not to buy if the thaw indicator is a particular color. In the instance shown the thaw indicator is a color body made by treating a base exchange clay, such as bentonite, with benzidine plus formaldehyde. This color body is yellow in the dry state and green in the wet state, both of these colors being quite brilliant and entirely different from each other. The location of the thaw indicator is pointed out by words on the package. The indicator can be a spot of paper impregnated with the color body or any other suitable area containing the color body. A small square rectangle, or other figure is sufficient. It must, of course, be accessible to liquid $H_2O$ when it reaches a predetermined thawing temperature and as in the case of Figure 1, solid $H_2O$ (with or without a solute) can be deliberately placed in contact with the indicator if necessary while assembling the package. As shown in Figure 2, printing is provided near the thaw indicator area, indicating the color if thawed and also where a clay-amine color body is used that has color in the dry state, indicating the color if not thawed.

Figure 3:
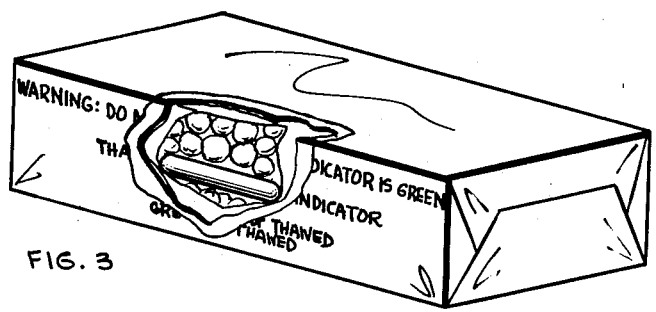
Figure 3 is a partial cut-away portion of a food package, illustrating the use of a sealed capsule within the package in contact with the frozen food contents.

Figure 3 indicates a frozen food package that can have the same legends printed on it as Figure 2, but Figure 3 illustrates the use of a sealed capsule. In the embodiment shown the capsule is provided within the package in contact with the frozen product, and the box is cut away to provide a window which is sealed by a transparent membrane, such as cellophane, or which may be sufficiently protected by an outer cellophane wrapper over the whole package. It is standard practice to seal the frozen food product itself within a transparent bag or wrapper, and the capsule can be placed inside that, or can be placed outside of such wrapper. There is an advantage in placing the thaw indicator somewhat within the package rather than on the surface inasmuch as the product will not become unsaleable by a false thaw indication merely by accidental warming of a small part of the outside of the package as could occasionally occur in handling the package without in any way thawing the contents sufficiently to injure same. My sealed capsule makes this placement possible without contaminating the foodstuff. The box can be mechanically constructed in a manner permitting the thaw indicator capsule to sit back appreciably below the surface of the box, for example by striking down the portions of the cardboard cut to permit the opening in the box, in a manner that will provide an enclosure for the capsule.

Figure 4:
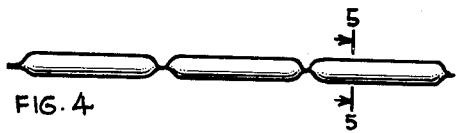
Figure 4 is an elevation view of a string of sealed capsules as manufactured for subsequent separation into individual units for incorporation into food packages.
Figure 5:
Figure 5 is a cross-section taken along the line 5—5 of Figure 4.

Of various procedures available for manufacturing a sealed capsule for use in accordance with the present invention, one desirable method is to use a tubing of thin transparent material, such as polyethylene or polyvinyl chloride or even cellophane, and fill portions of the tube, the filling being made of a mixture of dry clay-amine color body and ice. The ice can be ordinary $H_2O$ melting at 32° F., or can be a frozen aqueous solution of any solute that will lower the freezing point of water and not adversely affect the color change and present in an amount providing a desired predetermined freezing point. The sealing can be done, for example by suitable adhesive material placed at proper points between fillings in the tube as the tube progresses through the machine, or the entire interior of the tubing can be provided with pressure-sensitive adhesive whereupon simple crimping of the tube back of the inserted fill effects a sealing. The result is a continuous string of capsules as shown in Figure 4 that can be cut into individual units for use in the frozen food packages. All of these operations of course are to be conducted at temperatures below the freezing point of the ice. Figure 5 is a cross-section of one of the capsules.

One method of avoiding contact of the clay-amine color body with the frozen food material itself is to use an ordinary gelatin capsule containing the color body. In this case, while ice can be used within the capsule in contact with the color body, the capsule is also operative as a thaw indicator without said added ice so long as it is in such a location that liquid water will come in contact with the capsule. I have found that sufficient water permeates the capsule to cause the desired color change to occur on thawing. This type capsule has the advantage that it is commercially available, can be filled by standard capsule filling machines, and the filling can be carried out at ordinary temperatures rather than at sub-freezing temperatures. Further, this indicator is delayed somewhat in acting so that a genuine thawing of the package to a significant extent is necesssary before the color change indication occurs.

Clay-amine color bodies are known in the art, and reference is made thereto for numerous ones that can be employed for the present invention. Particular reference is made to the article by Hauser and Leggett, Journal of the American Chemical Society, 62, 1811 (1940). In general it can be stated that the amine must be aromatic, and it should be of the aniline type, i. e., have at least one amino group attached directly to an aryl nucleus. The amine can contain various substituents, but the more acidic substituents, for example carboxyl, hydroxyl, acyl groups, on the aryl nucleus decrease or prevent color formation. The amino nitrogen can be substituted with alkyl or other organic groups, recognizing, however, that not all substituted aromatic amines give clay-amine color bodies. The effect of substituents can be illustrated for example by comparing benzidine and dianisidine. Benzidene (p,p'-bianiline or 4,4'-diaminodiphenyl) when used to form a clay color body gives a colorless body in the dry state and a brilliant blue in the wet state. On the other hand, the color body made with dianisidine is colorless in the dry state but green in the wet state and the green is not nearly as intense a color as the blue of the benzidine. The same combinations of clay and amines but with added formaldehyde give in the case of benzidine, brilliant yellow color when dry and a brilliant green color when wet, whereas with dianisidiene the color both dry and wet is red, although the wet red is more intense than the dry red.

I have found that the use of an added aldehyde, preferably formaldehyde, and less preferably other aldehydes, e. g., acetaldehyde, benzaldehyde, is in many cases very advantageous for it results in a clay-amine color body in which the amine is so firmly bound that it cannot be extracted by organic solvents. Furthermore, in many cases the color is greatly intensified. I have also found that entirely different colors are usually formed when formaldehyde is used than those formed in its absence. Also, the products without formaldehyde tend to be unduly sensitive to acids and thus are not preferred. Different aldehydes in some cases give different colors with the same amine and clay.

The quantity of amine that can be used to give satisfactorily colored clays is subject to considerable variation, and of course is somewhat dependent upon the particular clay and the particular amine. It can be stated generally that quantities from 0.005 part amine per 100 parts of clay up to 5 parts amine per 100 parts clay, and preferably from 0.5 to 2 parts amine per 100 parts clay, can be used. Less than 0.005 weight per cent usually gives no color and of course in some cases somewhat more than that amount is needed for satisfactory color formation. Too much amine results in a very dark color that is not only unnecessary but undesirable.

When formaldehyde or other aldehyde is used, a preferred quantity is about 6 to 8 moles aldehyde per mole of amine. However, considerably greater quantities, several fold in excess of this, can also be used without any apparent adverse effects. Also considerably smaller quantities, for example equimolar quantities, are operative to give some valuable effect.

Clay-amine color bodies prepared from two particular amines are greatly preferred for the practice of my invention. These amines are benzidine and tolidine. The colors developed on their addition to clays are brilliant, and the difference between the dry color and the wet color is in each instance very marked. In the absence of formaldehyde both are colorless when dry, and the benzidine-clay color body is blue when wet while the color of the tolidine-clay color body is blue-green when wet. In the presence of formaldehyde, the benzidine product is yellow (or orange) when dry and green when wet—it will be noted that these colors are entirely different from those in the absence of formaldehyde. In the presence of formaldehyde, the tolidine body is orange when dry and blue-green when wet, this blue-green being considerably more green and less blue than that formed in the absence of formaldehyde. These color bodies, then, constitute preferred and highly satisfactory thaw indicators in accordance with the invention.

Many of the aromatic amines that form color on contact with clays result in color bodies that are so little different in appearance between wet and dry states as to be operable but not very desirable for use as thaw indicators. Many such color bodies are the same general color in the wet and dry state, but the wet state in each instance gives a more intense or deeper hue of the color; this is considered a change in color within the terms of the present invention. Thus, for example the metatoluidine-clay color body made in the presence of formaldehyde is pink when dry and in the wet state is a somewhat deeper pink. It will be apparent that while this material can be used as a thaw indicator, it is much preferred to use the color body made with benzidine or tolidine. In the absence of formaldehyde the metatoluidine product is colorless when dry and pink when wet. This is a more favorable material with respect to color change but without formaldehyde the amine is extractable with organic solvents and to a slow degree with aqueous media, and is undesirably sensitive to acids. Thus, as is generally the case, the color bodies made in the absence of formaldehyde contain the aromatic amine less tightly bound to the clay with attendant disadvantages.

The clay-amine color bodies can be prepared in a number of ways. The clay can be contacted with the vapors of the organic amine. Preferably, the clay is slurried in water or an alcohol such as methanol or ethanol, a concentrated slurry of say 50 parts by weight clay to 60 parts by weight water or alcohol being suitable. The amine is then introduced into the slurry, preferably as a solution in alcohol. After vigorous agitation any formaldehyde to be used can be added, formalin being preferred for this use. The color body is filtered or centrifuged from the liquid and then dried. Drying can best be effected at somewhat elevated temperatures, e. g., 50° C. and under a vacuum. Drying can also be done at atmospheric pressure at temperatures up to the boiling point of water, but preferably somewhat below, e. g., 80° C. to 90° C. Calcining the clay, either before or after formation of the color body, must be avoided as it destroys the capacity of the clay to form color bodies or destroys the color body if already formed. The final water content of the clay must be obviously sufficiently low that the color body is in the "dry" state.

Any type of clay can be used that forms color bodies with aromatic amines. The clay should have a substantial base exchange capacity, preferably at least 20 milliequivalents per 100 grams of clay. Those clays containing a comparatively high proportion of montmorillonite, e. g., sodium or calcium bentonite, are preferred. Kaolinite is less satisfactory than montmorillonite, but since most naturally occurring kaolinites contain appreciable quantities of montmorillonite, they are superior to pure kaolinite.

The following examples will serve to illustrate some of the various aspects of the present invention. Examples 1–10 show the effect on color caused by variations in methods of preparation, especially in the quantity of aldehyde used. Example 11 tabulates a dry and wet color of sodium bentonite treated with a variety of amines both with and without formaldehyde. Example 12 gives results of a series of thaw indicating tests.

*Example 1*

Twenty grams of Filtrol X–202 (an acid-treated calcium bentonite) was slurried in 30 ml. of water. To this slurry was added 0.2 gram (1 percent) benzidine dissolved in 10 ml. of methanol. The slurry was now a very pale blue. Addition of 0.35 ml. of 36 percent by weight formaldehyde solution was followed by development of a deep greenish blue color, which reached maximum intensity after 15 minutes. The colored product was filtered off, washed with 20 ml. water and 150 ml. methanol. The damp cake was greyish blue. On drying at 65° C. for 30 minutes, the product became light yellow. On moistening with water it became bright green.

*Example 2*

The preparation was as in Example 1, except that 0.7 ml. of 36 percent formalin was used. The slurry color was slightly greener than in Example 1, and the product dried to a deeper yellow. The green color on rewetting appeared about the same.

*Example 3*

The preparation was as in Example 1, except that 1.0 ml. of 36 percent formalin was used. The slurry color was definitely greener (less blue) than in Examples 1 and 2 and the dried product an intenser yellow.

*Example 4*

The preparation was as in Example 1, except that 2.1 ml. of 36 percent formalin was used. The slurry color was definitely green, with little or no evidence of a blue tint. The filter cake was also green. The dried product did not appear different in shade from that of Example 3.

*Example 5*

The preparation was as in Example 4, except that 30 ml. of methanol was substituted for water in preparing the initial clay slurry, and no water was used in washing the filter cake. The slurry after benzidine and formalin addition was blue-green, as was the filter cake. The product dried to a peach color, and rewet to a green somewhat brighter than the previous examples.

*Example 6*

The preparation was as in Example 5, except that acetone was substituted for the methanol used in slurrying the clay, dissolving the benzidine, and washing the cake. The slurry after benzidine and formalin addition, was grey-green. The product dried to a peach color more pronounced than that of Example 5, and upon rewetting gave a somewhat duller green.

*Example 7*

Ten grams of Filtrol X–202 slurried in 76 ml. of a saturated solution of benzidine in water (equals 0.15 gram benzidine, or 1.5 percent on clay) formed a pale blue slurry. Fifteen ml. of 36 percent formalin was added. The slurry now became bright green. The slurry was filtered, and the cake washed with 100 ml. water, and 200 ml. acetone. The dried product was bright yellow, and rewet to a bright green, although not so bright as that of Example 5.

*Example 8*

Thirty grams of Filtrol X–202 was slurried in 50 ml. of saturated aqueous benzidine solution (0.10 gram benzidine, or 0.33 per cent on clay). A yellowish to colorless slurry resulted. Addition of 3 ml. of 36 per cent formalin caused development of a yellow-green color. The product was filtered and washed as in Example 7. The dried product was pale yellow and rewet to a yellowish-green.

*Example 9*

The preparation was as in Example 1, but the formalin was omitted, resulting in a pale blue slurry. Ammonium hydroxide (28 per cent) was added until the slurry pH was 7. The resulting sky blue slurry was filtered and washed with 30 ml. water with no change in color. When washed with methanol, the cake turned brown, and faded slowly with continued washing. The dried product was white with a faint yellow tinge, and on rewetting became very pale blue over 10–15 minutes.

*Example 10*

About 10 grams Filtrol X–202 was slurried in 20 ml. saturated solution of paraformaldehyde in acetone. About 0.01 gram of benzidine was added. The slurry slowly became grey-green. A portion, on drying, became peach-colored and rewet to grey-green.

*Example 11*

While those skilled in the art will be able, by reference to the knowledge of the art and by simple tests, to determine those aromatic amines that form clay-amine color bodies suitable for the practice of the present invention, the following table is given by way of example of some of the aromatic amines that are suitable. The colors indicated in the table are those developed when a basic clay, e. g., sodium bentonite, is used. Where an acid clay, e. g., one prepared by treating sodium bentonite with aqueous acid to replace part or all of the sodium ions with hydrogen ions is used, the colors are usually different, and the colors developed in the presence of formaldehyde do not change in going from the dry to the wet state other than with respect to intensity. It is therefore generally preferred to employ basic clays with the amines mentioned in the following table. Dimethylaniline acts somewhat differently from the others, since its color depends upon heating and the passage of time. By heating and/or standing the dimethylaniline color goes through a series of colors ending in violet. Use of formaldehyde causes these changes to occur more rapidly. The following tabulation shows that benzidine and tolidine are preferred materials to be used.

| Amine | No Formaldehyde | Formaldehyde | Color | |
|---|---|---|---|---|
| | | | Dry | Wet |
| Aniline | X | | None | Green. |
| Do | | X | Yellow | Yellow. |
| Benzidine | X | | None | Blue. |
| Do | | X | Yellow | Green. |
| Dianisidine | X | | None | Do. |
| Do | | X | Red | Red. |
| Tolidine | X | | None | Blue-Green. |
| Do | | X | Orange | Blue-Green (greener). |
| o-Toluidine | X | | None | Yellow. |
| Do | | X | Yellow | Do. |
| m-Toludine | X | | None | Pink. |
| Do | | X | Pink | Do. |
| Monomethylaniline | X | | None | Green. |
| Do | | X | Pale yellow-green. | Do. |
| Dimethylaniline | X | | Blue-violet | Blue-violet. |
| Do | | X | Blue-violet | Do. |

*Example 12*

The following thaw indicating tests were made with a color body made from bentonite, benzidine and formaldehyde.

(A) A portion of the yellow dry form was placed in a glass bottle open to the atmosphere. This open bottle was placed in a Dry-Ice (solid $CO_2$) chest fairly near the bottom, a considerable distance from the door of the chest. After 10 weeks no color change had occurred.

(B) A similar open bottle containing a portion of the yellow dry form was placed in the Dry-Ice chest near the door, at a point where condensation of moisture from the atmosphere regularly takes place with resultant presence of considerable ice (solid $H_2O$) and occasional observation of traces of liquid water. After a period of 3 weeks the sample was yellow but with a faint tinge of green, believed to be due to a slight amount of liquid water having been condensed from the atmosphere at some time during the storage period. Frozen drops of ice were in contact with the color body. The sample had the same appearance after an additional storage period of 7 weeks.

(C) A portion of the yellow dry form of the benzidine-formaldehyde-bentonite color body was slurried in water at room temperature, resulting in immediate change of color to the green wet form. The slurry was frozen by being placed in the Dry Ice chest near the door. After 8 weeks storage in the Dry Ice chest the green color had undergone no change.

(D) An ordinary gelatin capsule sold commercially for containing medicaments was filled with a portion of the yellow dry form of the color body. It was placed in the bottle referred to under B above, after that bottle and its contained sample had been in storage for 16 days. After 3 weeks from the time the capsule had been placed in the bottle, the color body therein had taken on the same greenish-yellow appearance noted for the material open in the bottle. No further change in color had occurred after 4½ more weeks.

(E) A cartridge was made by filling a similar gelatin capsule with a portion of the yellow dry form of the color body, then dropped into a glass of water. Within one minute the color of the contents had undergone a change from yellow to green. Different types of gelatin capsules give different times for the start of the color change, depending upon the thickness of the capsule wall and the water-solubility of the gelatin used, permitting a wide variety of choices of sensitivity in the thaw indicator cartridge.

While the invention has been described herein with particular reference to various preferred embodiments theeorf, it will be appreciated that variations from the details given herein can be effected without departing from the invention in its broadest aspects. For example, although the invention has been described with particular reference to frozen foods, it can be used also in connection with numerous other products which must be maintained continuously frozen.

I claim:

1. In combination with a packaged frozen product, a thaw indicator comprising a clay-aromatic amine color body subject to change in color on contact with liquid $H_2O$ but having its color unaffected by contact with ice and accessible to liquid $H_2O$ on the occurrence of thawing.

2. In combination with a packaged frozen product, a thaw indicator comprising a clay-aromatic amine-aldehyde color body subject to change in color on contact with liquid $H_2O$ but having its color unaffected by contact with ice and accessible to liquid $H_2O$ on the occurrence of thawing.

3. A frozen body having thereon an indicium comprising the product obtained by treating a base exchange clay with an aromatic amine of the aniline type capable of forming with said clay a material having color at least in contact with liquid $H_2O$, said indicium having been applied to said frozen body in the absence of liqiud $H_2O$, and subject to change in color on accumulation of liquid atmospheric moisture by condensation and increase of the body surface to a temperature above the freezing point of water.

4. An article of manufacture, useful as a thaw indicator, comprising a sealed capsule containing ice and a clay-aromatic amine product subject to change in color on contact with liquid $H_2O$.

5. An article of manufacture, useful as a thaw indicator, comprising a gelatin capsule permeable to liquid $H_2O$ and containing a clay-aromatic amine product subject to change in color on contact with liquid $H_2O$ when said gelatin capsule is contacted with liquid $H_2O$ but having its color unaffected by contact with ice.

6. A thaw indicator comprising a sheet of fibrous material having impregnated therein a word or words indicating the occurrence of thawing, said impregnation being invisible in the dry state and comprising a clay-aromatic amine color body colorless in the dry state and developing visible color on contact with liquid $H_2O$ and having its color unaffected by contact with ice.

7. A packaged frozen food comprising a thaw indicator capsule in contact with said food and containing a clay-aromatic amine color body subject to alteration in color on contact with liquid $H_2O$, and transparent wrapping around said package permitting the viewing of the contents thereof at least with respect to said capsule.

8. A thaw indicator comprising a bentonite-benzidine product in contact with solid $H_2O$ and subject to color change on said solid $H_2O$ melting to liquid $H_2O$.

9. A thaw indicator comprising a bentonite-benzidine-formaldehyde product in contact with solid $H_2O$ and subject to color change on said solid $H_2O$ melting to liquid $H_2O$.

10. A thaw indicator comprising a bentonite-tolidine product in contact with solid $H_2O$ and subject to color change on said solid $H_2O$ melting to liquid $H_2O$.

11. A thaw indicator comprising a bentonite-tolidine-formaldehyde product in contact with solid $H_2O$ and subject to color change on said solid H₂O melting to liquid H₂O.

12. An article of manufacture, useful as a thaw indicator, comprising a sealed capsule containing a clay-aromatic amine product subject to change in color on contact with liquid H₂O and a frozen aqueous solution having a predetermined melting point below 32° F.

13. A wrapping sheet having an area comprising a clay-aromatic amine product not subject to change in color on contact with ice but subject to change in color on contact with liquid H₂O.

14. A wrapping sheet having an area comprising a clay-aromatic amine-aldehyde product not subject to change in color on contact with ice but subject to change in color on contact with liquid H₂O.

15. A wrapping sheet having an area comprising a clay-aromatic amine-formaldehyde product not subject to change in color on contact with ice but subject to change in color on contact with liquid H₂O.

16. A wrapping sheet having an area comprising a product obtained by treating a base-exchange clay with an aromatic amine of the aniline type capable of forming with said clay a material having color at least in contact with liquid H₂O, said product not being subject to change in color on contact with ice but subject to change in color on contact with liquid H₂O.

17. The method of permitting determination of whether a frozen product has been thawed, which comprises associating a clay-aromatic amine color body with said frozen product in such manner that said color body is accessible to liquid H₂O only on the occurrence of thawing thereby permitting observing that the said color body has its dry color so long as thawing has not occurred and has its wet color at all times after thawing has occurred.

18. The method of claim 17 wherein said color body is a clay-aromatic amine-aldehyde color body.

References Cited in the file of this patent

UNITED STATES PATENTS

| | | |
|---|---|---|
| 2,348,639 | O'Brien | May 9, 1944 |
| 2,460,215 | Chase | Jan. 25, 1949 |
| 2,505,484 | Green | Apr. 25, 1950 |
| 2,662,018 | Smith | Dec. 8, 1953 |